(12) United States Patent
Yamashiro et al.

(10) Patent No.: US 10,499,422 B2
(45) Date of Patent: Dec. 3, 2019

(54) WIRELESS COMMUNICATION APPARATUS AND WIRELESS COMMUNICATION SYSTEM

(71) Applicant: DENSO CORPORATION, Kariya, Aichi-pref. (JP)

(72) Inventors: Takahisa Yamashiro, Kariya (JP); Seigou Kumabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/766,522

(22) PCT Filed: Sep. 5, 2016

(86) PCT No.: PCT/JP2016/075933
§ 371 (c)(1),
(2) Date: Apr. 6, 2018

(87) PCT Pub. No.: WO2017/061203
PCT Pub. Date: Apr. 13, 2017

(65) Prior Publication Data
US 2018/0288807 A1    Oct. 4, 2018

(30) Foreign Application Priority Data

Oct. 8, 2015 (JP) ................. 2015-200536

(51) Int. Cl.
*H04W 74/02* (2009.01)
*H04W 4/029* (2018.01)
(Continued)

(52) U.S. Cl.
CPC ........... *H04W 74/02* (2013.01); *H04W 4/029* (2018.02); *H04W 4/44* (2018.02); *H04W 24/10* (2013.01);
(Continued)

(58) Field of Classification Search
CPC ....... H04W 74/02; H04W 4/029; H04W 4/44; H04W 4/46; H04W 24/10; H04W 74/0825; H04W 72/0446
See application file for complete search history.

(56) References Cited

U.S. PATENT DOCUMENTS 8,761,676 B2   6/2014 Hu et al.
8,942,253 B2   1/2015 Juan et al.
(Continued)

FOREIGN PATENT DOCUMENTS

JP    2007096902 A    4/2007

*Primary Examiner* — Ajay Cattungal
(74) *Attorney, Agent, or Firm* — Harness, Dickey & Pierce, P.L.C.

(57) ABSTRACT

A wireless communication apparatus is provided. The wireless communication apparatus is provided with: a control part performing repetitive transmission of a repetitive signal, that is, a signal that needs to be repeatedly transmitted, from a transmission part in the form of an electric wave; a reception part receiving an electric wave; and a signal collision determination part determining, on the basis of the electric wave received by the reception part while the repetitive signal is being transmitted by the control part, whether or not the repetitive signal transmitted from the transmission part is in collision with a signal transmitted by a different device. When the signal collision determination part has determined that the repetitive signal is in collision with another signal, the control part changes the transmission timing of the repetitive signal.

5 Claims, 9 Drawing Sheets

(51) Int. Cl.
  *H04W 4/44* (2018.01)
  *H04W 24/10* (2009.01)
  *H04W 74/08* (2009.01)
  *H04W 4/46* (2018.01)
  *H04W 72/04* (2009.01)

(52) U.S. Cl.
  CPC .......... *H04W 74/0825* (2013.01); *H04W 4/46* (2018.02); *H04W 72/0446* (2013.01)

(56) References Cited

U.S. PATENT DOCUMENTS

| | | | | |
|---|---|---|---|---|
| 2007/0165589 A1* | 7/2007 | Sakoda | ................ | H04W 48/08 370/345 |
| 2009/0238133 A1 | 9/2009 | Sakoda | | |
| 2010/0322287 A1* | 12/2010 | Truong | ............ | H04W 72/1215 375/133 |
| 2013/0301434 A1* | 11/2013 | Krishnamurthy | ..... | H04L 1/0026 370/252 |
| 2013/0301542 A1* | 11/2013 | Krishnamurthy | ..... | H04W 52/50 370/329 |
| 2013/0315157 A1* | 11/2013 | Krishnamurthy | ..... | H04L 5/0053 370/329 |
| 2014/0036747 A1* | 2/2014 | Nory | ................ | H04W 72/0406 370/311 |
| 2015/0085767 A1* | 3/2015 | Einhaus | ................ | H04L 1/0001 370/329 |
| 2015/0110004 A1* | 4/2015 | Katz | ..................... | H04W 28/18 370/329 |
| 2015/0195818 A1* | 7/2015 | Davydov | ............ | H04L 27/3494 370/329 |
| 2015/0295838 A1* | 10/2015 | Liu | ....................... | H04L 5/0007 370/235 |
| 2015/0312071 A1* | 10/2015 | Chen | .................... | H04L 1/0016 370/329 |
| 2015/0372784 A1* | 12/2015 | Xu | ........................ | H04L 27/36 370/329 |
| 2018/0062669 A1* | 3/2018 | Wu | ...................... | H03M 13/29 |

* cited by examiner

WIRELESS COMMUNICATION APPARATUS AND WIRELESS COMMUNICATION SYSTEM

CROSS REFERENCE TO RELATED APPLICATIONS

This application is a U.S. National Phase Application under 35 U.S.C. 371 of International Application No. PCT/JP2016/075933 filed on Sep. 5, 2016 and published in Japanese as WO 2017/061203 A1 on Apr. 13, 2017. This application is based on and claims the benefit of priority from Japanese Patent Application No. 2015-200536 filed on Oct. 8, 2015. The entire disclosures of all of the above applications are incorporated herein by reference.

TECHNICAL FIELD

The present disclosure relates to a wireless communication apparatus and a wireless communication system provided with the multiple wireless communication apparatus, and particularly, to a technique for avoiding collision of signals transmitted from the wireless communication apparatus.

BACKGROUND ART

CSAMA/CA is widely known as a technique for avoiding collision of signals transmitted by wireless communication apparatus. CSAMA/CA is an abbreviation for "carrier sense multiple access/collision avoidance."

Further, as widely known as a hidden terminal problem, even when the technique of CSAMA/CA is used, signals may collide with each other. In Patent Literature 1, while a subject terminal is transmitting a packet, collision of the packet with a packet transmitted by another terminal is monitored. When the packet collision has been detected, the subject terminal stops the packet transmission.

PRIOR ART LITERATURES

Patent Literature

Patent Literature 1: JP 2007-96902 A

SUMMARY OF INVENTION

Patent Literature 1 discloses a technique to stop the transmission of a signal when collision of the transmitted signal has been detected. According to the technique disclosed in Patent Literature 1, however, the collision of the signal cannot be avoided. When multiple signals collide with each other, all of the colliding signals cannot be decoded by a receiver. Thus, the transmitted signals become wasted. Therefore, as a matter of course, avoiding collision of signals may be more desired than detecting collision of signals and stopping transmission of the signals.

It is an object of the present disclosure to provide a wireless communication apparatus and a wireless communication system that enable to reduce collision of signals.

A wireless communication apparatus according to one aspect of the present disclosure includes: a transmission part that transmits an electric wave; a transmission control part that transmits, as an electric wave, a repetitive signal that needs to be repeatedly transmitted from the transmission part within a transmission time slot that is periodically repeated at a transmission timing determined, based on a start time of the transmission time slot and repeatedly transmits the repetitive signal by repetition of the transmission time slot; a reception part that receives an electric wave; and a signal collision determination part that determines whether the repetitive signal transmitted from the transmission part is in collision with a signal transmitted by a different device, based on an electric wave that is received by the reception part while the transmission control part is transmitting the repetitive signal. The transmission control part changes the transmission timing of the repetitive signal, based on a determination that there is a collision of the repetitive signal by the signal collision determination part.

The wireless communication apparatus includes the signal collision determination part. While the transmission control part is transmitting the repetitive signal, the signal collision determination part determines whether the repetitive signal is in collision with a signal transmitted by a different device. When the signal that is in collision with the repetitive signal is a repetitive signal transmitted by the different device, there is a high possibility that the different device transmits a signal at the same transmission timing also in the next transmission time slot. Thus, the transmission control part changes the transmission timing of the repetitive signal, based on the determination that there is a collision of the repetitive signal by the signal collision determination part. Accordingly, in the next transmission of the repetitive signal, even when the different device also transmits the repetitive signal, there is a high possibility that the repetitive signal has no collision with the repetitive signal transmitted by the different device. Thus, it may be possible to reduce collision of signals.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

<First Embodiment>

Figure 1:
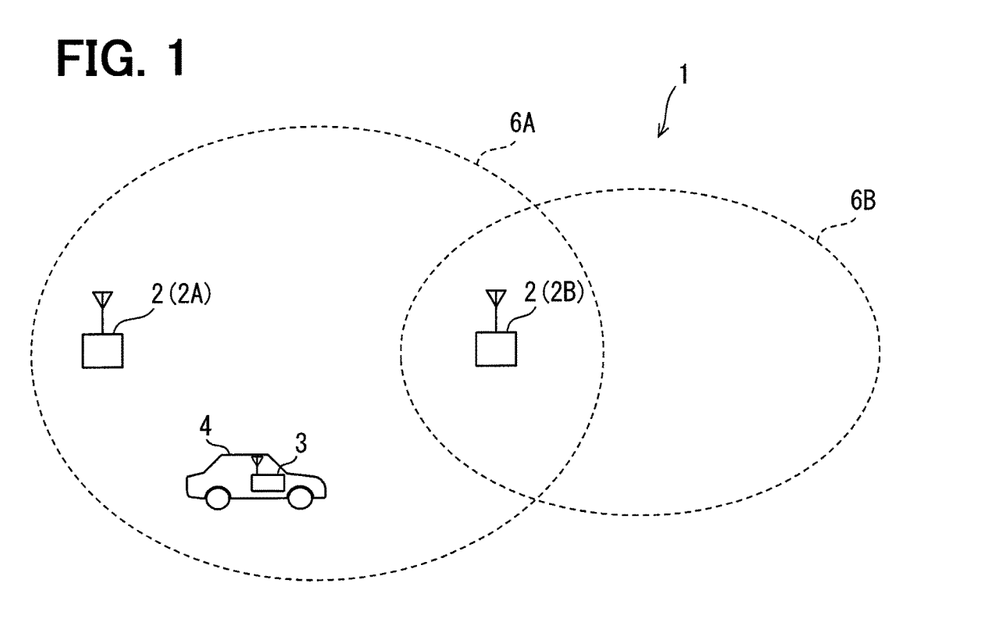
FIG. 1 is a diagram showing a configuration of a wireless communication system of a first embodiment.

Hereinbelow, an embodiment will be described with reference to the drawings. As illustrated in FIG. 1, a wireless communication system 1 according to a first embodiment is provided with a roadside machine 2 and an onboard machine 3. The roadside machine 2 corresponds to a wireless communication apparatus, and the onboard machine 3 corresponds to a service receiving terminal.

[Overview Configuration of Wireless Communication System 1]

FIG. 1 illustrates two roadside machines 2A, 2B. However, three or more roadside machines 2 may be provided. When the multiple roadside machines 2A, 2B are not distinguished from each other, the roadside machines 2A, 2B are referred to as the roadside machines 2. Further, FIG. 1 illustrates only one onboard machine 3. However, multiple onboard machines 3 may be provided. The roadside machine 2 and the onboard machine 3 communicate with each other in compliance with the WAVE standards. WAVE is an abbreviation for "wireless access in vehicular environments."

Because of compliance with the WAVE standards, the wireless communication system 1 sets one control channel and multiple service channels as communication channels. The control channel and the service channels are set to predetermined frequency channels different from each other. All of the control channel and the service channels belong to a 5.8 GHz band or a 5.9 GHz band.

The roadside machine 2 notifies a WSA that refers to "wave service advertisement" through the control channel. The WSA corresponds to service start information and includes various pieces of information that needs to be acquired by the onboard machine 3 to start a service. For example, the WSA includes channel information which designates a service channel. Further, the roadside machine 2 transmits service execution information through a service channel designated by the WSA. The roadside machine 2 may be fixed to a road side or may be a movable device.

The service execution information needs to be communicated between the roadside machine 2 and the onboard machine 3 to execute a service. The service execution information includes information transmitted by the roadside machine 2 and information transmitted by the onboard machine 3. However, for example, in some services such as a road traffic information distribution service, the service execution information includes only information transmitted by the roadside machine 2.

The onboard machine 3 is mounted on a vehicle 4. Thus, the onboard machine 3 is a movable device. The onboard machine 3 is capable of receiving the WSA and the service execution information and also capable of performing vehicle-to-vehicle communication with another onboard machine 3.

[Configuration of Roadside Machine 2]

The roadside machine 2 performs road-to-vehicle communication with the onboard machine 3 that is present in a wireless communication area 6 formed by the roadside machine 2 and executes a predetermined service by transmitting various pieces of information to the onboard machine 3 and acquiring various pieces of information from the onboard machine 3. The wireless communication area is an area within the reach of a signal transmitted by the roadside machine 2 with a predetermined strength detectable by the onboard machine 3 or higher, and corresponds to a transmission range.

The roadside machine 2 is disposed at a position suitable for a service provided by the roadside machine 2. For example, the roadside machine 2 is disposed at an intersection, the middle of a road that connects intersections, or an entrance to a specific facility (for example, a parking lot, a store, or a toll road). The wireless communication area 6 of the roadside machine 2 can be set according to a service provided by the roadside machine 2. In other words, an output of an electric wave transmitted by the roadside machine 2 can be set according to a service provided by the roadside machine 2. When the set wireless communication area 6 is large, the set wireless communication area 6 may overlap the wireless communication area 6 of another roadside machine 2.

FIG. 1 illustrates a wireless communication area 6A of the roadside machine 2A and also illustrates a wireless communication area 6B of the roadside machine 2B. As illustrated in FIG. 1, these two wireless communication areas 6A, 6B partially overlap each other. In the example of FIG. 1, the roadside machine 2B is included in the wireless communication area 6A of the roadside machine 2A. On the other hand, the position of the roadside machine 2A is outside the wireless communication area 6B of the roadside machine 2B. These two wireless communication areas 6A, 6B are directional areas. However, each of the wireless communication areas 6 may be a non-directional area, that is, an area having a perfect circle shape.

Figure 2:
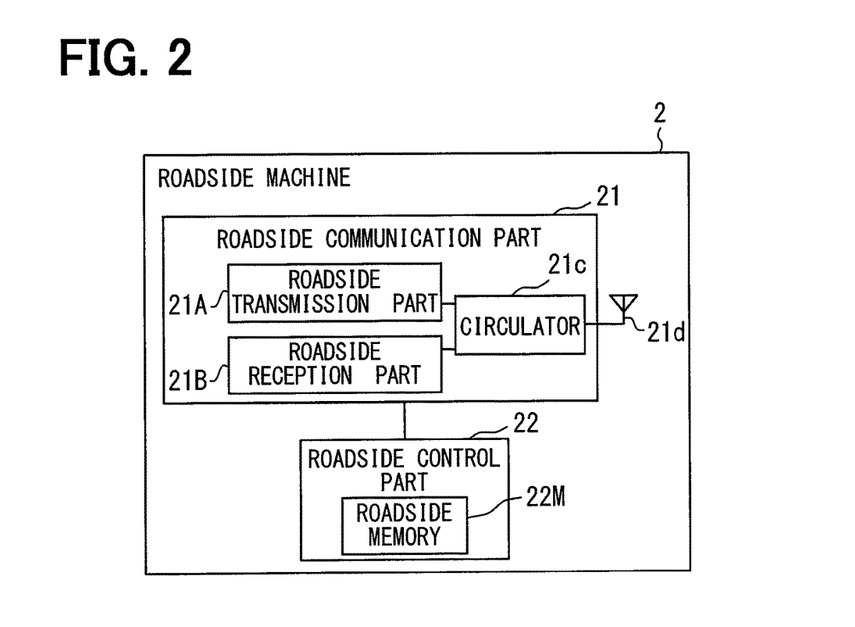
FIG. 2 is a block diagram illustrating the configuration of a roadside machine of FIG. 1.

As illustrated in FIG. 2, the roadside machine 2 is provided with a roadside communication part 21 and a roadside control part 22. The roadside communication part 21 and the roadside control part 22 are mutually communicably connected.

The roadside communication part 21 performs road-to-vehicle communication with the onboard machine 3 that is present in the wireless communication area 6 formed by the roadside machine 2 by short range communication. The short range communication is a communication system that performs direct communication through no relay device. The wireless communication area 6 formed by the roadside machine 2 is within a several hundred meter radius in many cases. However, the range of the wireless communication area 6 varies according to a service provided by the roadside machine 2, and may be within an approximately 10 meter radius or an approximately 1 km radius.

The roadside communication part 21 includes two operation modes: a mode that performs communication using the control channel; and a mode that performs communication using the service channel. That is, the roadside communication part 21 performs both of the communications with the onboard machine 3 using the control channel and the service channel.

The roadside communication part 21 is provided with a roadside transmission part 21A, a roadside reception part 21B, a circulator 21c, and an antenna 21d. The roadside transmission part 21A is capable of setting a transmission channel that is a frequency channel for transmitting an electric wave by selecting one channel from the control channel and the multiple service channels. The roadside transmission part 21A modulates data input from the roadside control part 22, further converts the modulated data to an electric wave having a frequency of the transmission channel, and transmits the electric wave. The roadside transmission part 21A corresponds to a transmission part.

The roadside reception part 21B sets a reception channel that is a frequency channel for receiving an electric wave to the same channel as the transmission channel, and receives an electric wave transmitted from the onboard machine 3 through the set reception channel. Further, the roadside reception part 21B demodulates the received electric wave to extract a signal and outputs the signal to the roadside control part 22. The roadside reception part 21B corresponds to a reception part.

The circulator 21c guides a signal from the roadside transmission part 21A to the antenna 21d and guides a signal representing an electric wave received by the antenna 21d to the roadside reception part 21B. Providing the circulator 21c enables the roadside communication part 21 to receive a signal by the roadside reception part 21B while transmitting a signal from the roadside transmission part 21A.

The roadside control part 22 is configured as a common computer and provided with a CPU, a non-volatile memory such as a ROM or a flash memory, a volatile memory such as a RAM, an I/O, and a bus line which connects these components which are all known.

A roadside memory 22M provided in the roadside control part 22 is a non-volatile storage medium and implemented by, for example, a flash memory. Program modules and data for executing various processes and a terminal ID assigned to the roadside machine 2 are stored in the roadside memory 22M. Further, information for generating a WSA and information for generating service execution information are also stored in the roadside memory 22M. Furthermore, a received signal strength of a signal received by the roadside reception part 21B is also temporarily stored in the roadside memory 22M.

Figure 3:
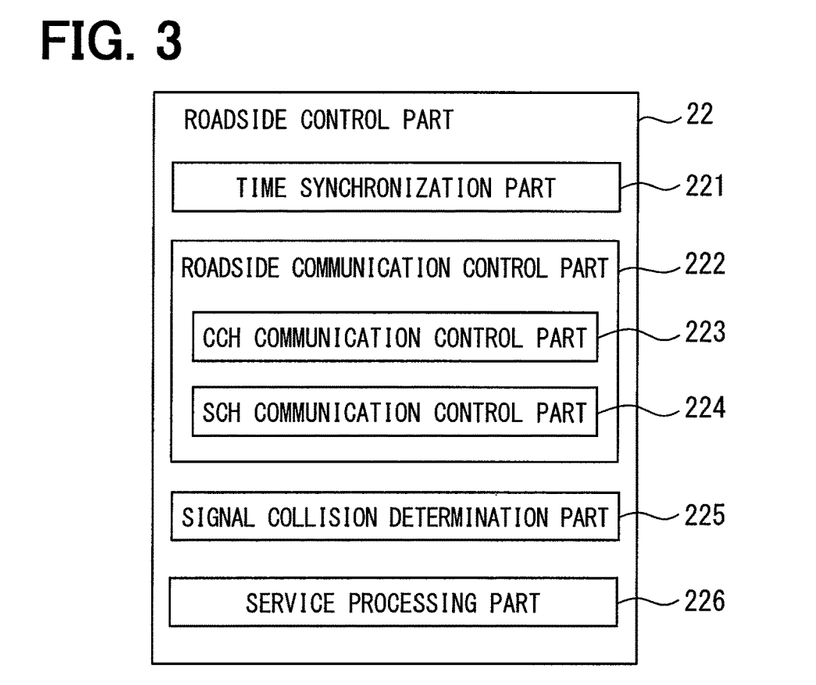
FIG. 3 is a block diagram illustrating functions of a roadside control part of FIG. 2.

As illustrated in FIG. 3, the roadside control part 22 is provided with a time synchronization part 221, a roadside communication control part 222, a signal collision determination part 225, and a service processing part 226 as functional blocks implemented by executing the above program modules. Some or all of the functions executed by the roadside control part 22 may be configured as hardware by one or more ICs.

The time synchronization part 221 performs a process for synchronizing time information held by the roadside control part 22 with a reference time. The time information held by the roadside control part 22 is measured, based on a clock signal of the CPU. However, when time is measured, based on the clock signal, the time may be gradually deviated from the reference time. Thus, the time synchronization part 221 synchronizes the time information held by the roadside control part 22 with the reference time. The reference time is, for example, a time used in a global navigation satellite system (hereinbelow, referred to as GNSS). Hereinbelow, the time is referred to as a GNSS time. The time synchronization part 221 communicates with a server that is provided outside, and acquires the reference time. Alternatively, the roadside machine 2 may be provided with a GNSS receiver, the GNSS receiver may receive a signal including the GNSS time from a GNSS artificial satellite, and the time synchronization part 221 may acquire the GNSS time from the GNSS receiver.

The roadside communication control part 222 controls the operation of the roadside communication part 21 and performs a switch between communication through the control channel and communication through the service channel. The roadside communication control part 222 generates information that corresponds to the operation mode of the roadside communication part 21 and should be transmitted from the roadside communication part 21 and causes the roadside communication part 21 to transmit the information. Further, the roadside communication control part 222 acquires data received by the roadside communication part 21 and provides the acquired data to the service processing part 226.

The roadside communication control part 222 is provided with a CCH communication control part 223 and an SCH communication control part 224 as smaller functional blocks. In each of the parts, CCH refers to the control channel and SCH refers to the service channel.

The CCH communication control part 223 takes charge of control of communication using the control channel. The CCH communication control part 223 generates a WSA, sets the transmission channel of the roadside communication part 21 to the control channel, and causes the roadside communication part 21 to transmit the generated WSA in a broadcast system. Further, the CCH communication control part 223 acquires data that is received by the roadside communication part 21 by communication using the control channel and provides the acquired data to the service processing part 226.

Figure 4:
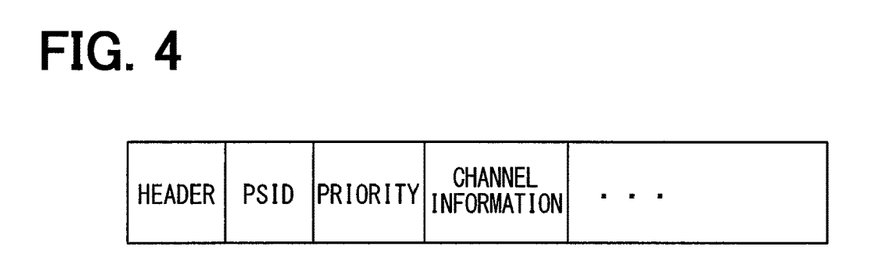
FIG. 4 is a diagram exemplifying the configuration of a WSA generated by a CCH communication control part.

FIG. 4 illustrates the configuration of the WSA generated by the CCH communication control part 223. As illustrated in FIG. 4, the WSA includes a header, a PSID, priority, and channel information. The header is information for recognizing that received data is a WSA in the onboard machine 3, which is a reception side device. The header includes, for example, information indicating a version of the WAVE standards and information for distinguishing the WSA from another information such as the service execution information.

The PSID is information that determines the type of a service provided by a service provider through the roadside machine 2. The priority is information that determines the priority of a service specified by the PSID among various services provided by various roadside machines 2. The channel information is a channel number of multiple service channels that is used by the roadside machine 2 for providing a service. The service channel may be determined according to the provided service, and multiple services may be associated with the same service channel.

The time at which the CCH communication control part 223 causes the WSA to be transmitted corresponds to a control channel time slot. The roadside communication control part 222 divides time into the control channel time slot and a service channel time slot.

Figure 5:
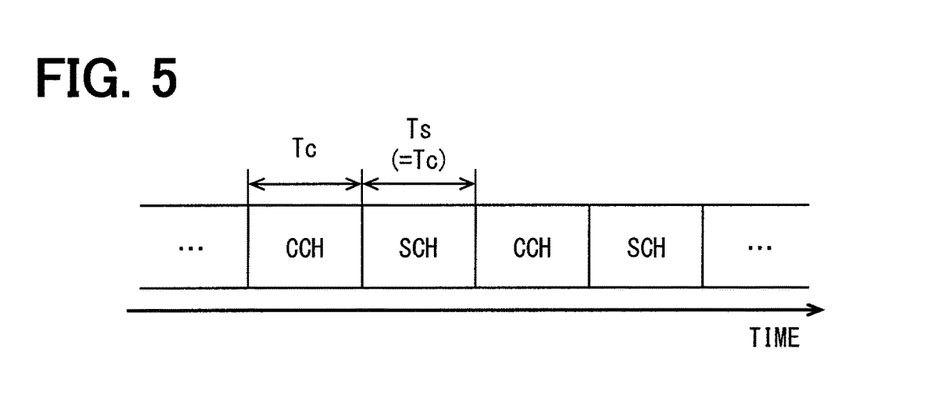
FIG. 5 is a diagram illustrating a change with time of a communication channel of a roadside communication part.

FIG. 5 illustrates a change with time of the communication channel of the roadside communication part 21. The communication channel of the roadside communication part 21 refers to the transmission channel of the roadside transmission part 21A and the reception channel of the roadside reception part 21B. The transmission channel and the reception channel are constantly set to the same frequency channel.

In the example of FIG. 5, the control channel and the service channel are alternately set. A time slot in which the communication channel is set to the control channel is referred to as the control channel time slot, and a time slot in which the communication channel is set to the service channel is referred to as the service channel time slot.

The length of the control channel time slot and the length of the service channel time slot are equal to each other and, for example, each 50 milliseconds. Further, a start time of the control channel time slot and a start time of the service channel time slot are times determined by a reference time system. The control channel time slot and the service channel time slot are periodically repeated time slots. The control channel time slot corresponds to a transmission time slot.

The CCH communication control part 223 repeatedly transmits the WSA each control channel time slot. Thus, the WSA corresponds to a repetitive signal, and the CCH communication control part 223 which controls the transmission of the WSA corresponds to a transmission control part.

The SCH communication control part 224 takes charge of control of communication using a predetermined service channel. The SCH communication control part 224 generates service execution information, sets the transmission channel of the roadside communication part 21 to a service channel that is determined according to the type of a service, and causes the roadside communication part 21 to transmit the generated service execution information. The time at which the SCH communication control part 224 causes the roadside communication part 21 to transmit the generated service execution information corresponds to the service channel time slot. A transmission system may be any of broadcast, unicast, and multicast. Which transmission system is used is determined according to the type of a service. Further, the SCH communication control part 224 acquires data received by the roadside communication part 21 by communication using the service channel, and provides the acquired data to the service processing part 226.

When the CCH communication control part 223 controls the roadside transmission part 21A so that the roadside transmission part 21A transmits a WSA, the signal collision determination part 225 determines whether the WSA is in collision with a signal transmitted by a different device. A method for the determination will be described with reference to the flowchart illustrated in FIG. 8.

The service processing part 226 provides a predetermined service to the onboard machine 3, based on data provided from the roadside communication control part 222. Examples of the service to be provided include an automatic fare collection service during a travel on a toll road, an automatic parking fee collection service during parking, a traffic information distribution service, a positional information notification service, and an advertisement distribution service.

[Configuration of Onboard Machine 3]

Figure 6:
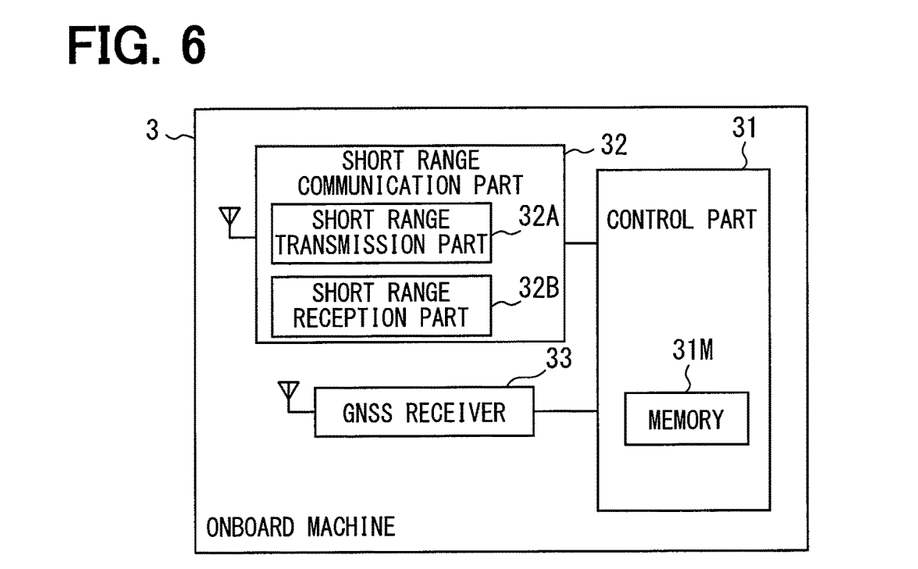
FIG. 6 is a block diagram illustrating the configuration of an onboard machine of FIG. 1.

Next, the configuration of the onboard machine 3 will be described. As illustrated in FIG. 6, the onboard machine 3 is provided with a control part 31, a short range communication part 32, and a GNSS receiver 33. The control part 31 is mutually communicably connected to the short range communication part 32 and the GNSS receiver 33.

The short range communication part 32 performs short range communication with the roadside communication part 21 of the roadside machine 2 and the short range communication part 32 provided in another onboard machine 3. A communication range of the short range communication part 32 is, for example, approximately several hundred meters. Further, the short range communication of the present embodiment uses, for example, the control channel or the service channel described above. The short range communication part 32 is provided with a short range reception part 32B that demodulates a signal received by an antenna and outputs the demodulated signal to the control part 31 and a short range transmission part 32A that modulates data input from the control part 31, further converts the modulated data to an electric wave, and transmits the electric wave to surroundings.

The short range reception part 32B selects one channel from the control channel and the service channels, sets the selected channel as a reception channel, and receives an electric wave transmitted from the roadside machine 2 through the set reception channel. Then, the short range reception part 32B demodulates the received electric wave to extract a signal and outputs the signal to the roadside control part 22.

The short range transmission part 32A sets a transmission channel to the same frequency channel as the reception channel, modulates data input from the roadside control part 22, further converts the modulated data to an electric wave having the frequency of the transmission channel, and transmits the electric wave.

The GNSS receiver 33 calculates the current position of the GNSS receiver 33 by receiving an electric wave from a satellite used in GNSS. The current position calculated by the GNSS receiver 33 is, for example, represented by latitude and longitude. Information indicating the current position calculated by the GNSS receiver 33 is sequentially (for example, each 100 milliseconds) provided to the control part 31.

Further, the GNSS receiver 33 outputs a PPS signal each one second while acquiring the GNSS satellite. PPS is an abbreviation for "pulse per second." The PPS signal functions as a signal indicating the timing of an integer second, in other words, the timing when second is switched.

The control part 31 is configured as a common computer and provided with a CPU, a non-volatile memory such as a ROM or a flash memory, a volatile memory such as a RAM, an I/O, and a bus line which connects these components which are all known.

A memory 31M provided in the control part 31 is a non-volatile storage medium and implemented by, for example, a flash memory or a ROM. Program modules and data for executing various processes and a terminal ID assigned to the onboard machine 3 are stored in the memory 31M. Further, a WSA received by the short range reception part 32B is temporarily stored in the memory 31M.

Figure 7:
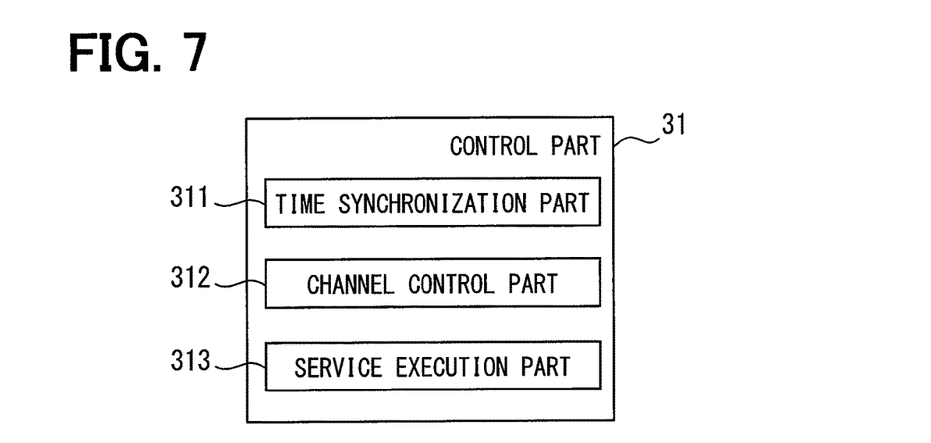
FIG. 7 is a block diagram illustrating functions of a control part of FIG. 6.

As illustrated in FIG. 7, the control part 31 is provided with a time synchronization part 311, a channel control part 312, and a service execution part 313 as functional blocks implemented by executing the above program modules. Some or all of the functions executed by the control part 31 may be configured as hardware by one or more ICs.

The time synchronization part 311 performs a process for synchronizing time information held by the control part 31 with the reference time. Since the onboard machine 3 is provided with the GNSS receiver 33, the time synchronization part 311 acquires a signal including the GNSS time received by the GNSS receiver 33 from the GNSS artificial satellite to perform the synchronization process.

The channel control part 312 sets a communication channel of the short range communication part 32 to either the control channel or the service channel. Specifically, when a WSA is received through the control channel as the communication channel, the communication channel is switched to a service channel determined by the WSA from a start time of the first service channel time slot after the reception of the WSA. Thereafter, during the execution of a service, the communication channel is set to the service channel in the service channel time slot and set to the control channel in the control channel time slot. In the service channel time slot during the execution of the service, the short range communication part 32 transmits and receives information for executing the service to and from the roadside machine 2.

When the transmission and reception of the information for executing the service are finished, the channel control part 312 fixes the communication channel to the control channel. However, when a WSA relating to a service that differs from the service under execution is received during the execution of the service, the channel control part 312 changes the service channel to be opened to a service channel determined by the received WSA. Then, the channel control part 312 continues control for alternately opening the service channel and the control channel.

When the short range reception part 32B receives a WSA while the channel control part 312 sets the communication channel to the control channel, the service execution part 313 determines a service to be executed, based on the received WSA. Further, the service execution part 313 acquires service execution information received by the short range reception part 32B while the channel control part 312 sets the communication channel to the service channel and determines data requested by the roadside machine 2, based on the acquired service execution information. Then, the service execution part 313 causes the short range transmission part 32A to transmit the determined data to the roadside machine 2.

[Processing of Roadside Control Part 22]

Figure 8:
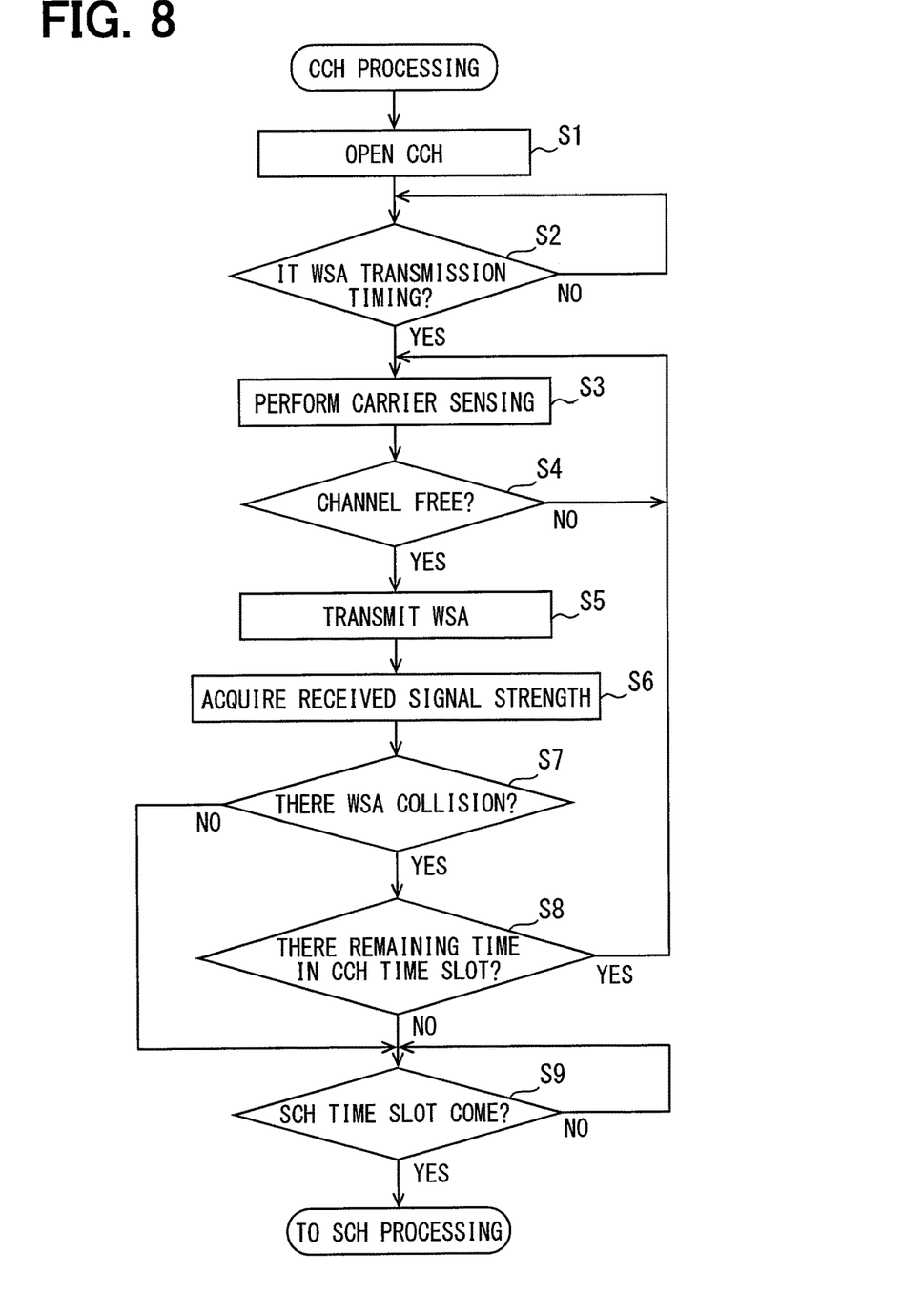
FIG. 8 is a flowchart illustrating CCH processing executed by the roadside control part of FIG. 2.
Figure 9:
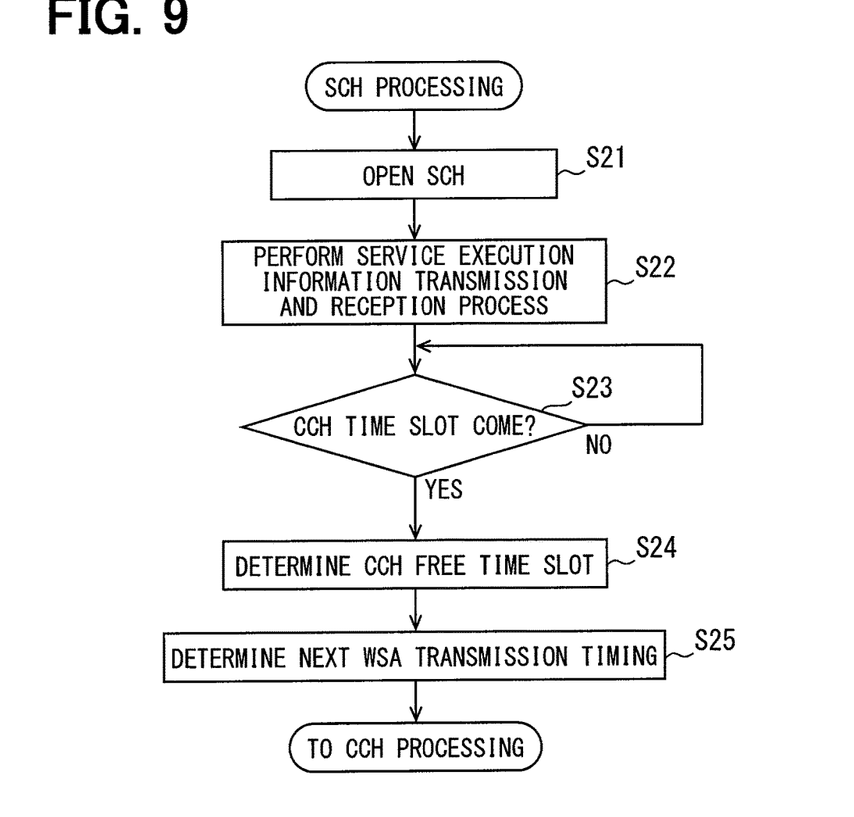
FIG. 9 is a flowchart illustrating SCH processing executed by the roadside control part of FIG. 2.

FIG. 8 and FIG. 9 are flowcharts describing processing executed by the roadside control part 22. In the roadside control part 22, in addition to the processing illustrated in FIG. 8 and FIG. 9, the time synchronization part 221 periodically performs the synchronization process.

The roadside control part 22 repeatedly executes the processing illustrated in FIG. 8 and FIG. 9 while power is ON. The processing of FIG. 8 is performed with the communication channel set to the control channel and thus referred to as CCH processing. The processing of FIG. 9 is performed with the communication channel set to the service channel and thus referred to as SCH processing.

First, the CCH processing illustrated in FIG. 8 will be described. In FIG. 8, step S6 and step S7 are processes performed by the signal collision determination part 225, and the other steps are processes performed by the CCH communication control part 223.

In step S1, the control channel is opened. That is, the transmission channel and the reception channel are set to the control channel.

In step S2, it is determined whether a transmission timing of transmitting a WSA has come. The WSA transmission timing is a timing that is determined, based on the start time of the control channel time slot. When the determination of step S2 is NO, the determination of step S2 is repeated. When the determination of step S2 is YES, a move to step S3 is made.

In step S3, carrier sensing is executed. In step S4, it is determined whether the result of the carrier sensing shows that the communication channel is free. When it is determined that the communication channel is busy, the determination of step S4 becomes NO. When the determination of step S4 is NO, a return to step S3 is made, and the carrier sensing is continued. When the control channel time slot is over during the repetition of the processes of step S3 and step S4, a move to the processing of FIG. 9 is made.

When it is determined that the communication channel is free in step S3, the determination of step S4 becomes YES. As with known CSMA/CA, the carrier sensing executed in step S3 performs the determination whether the communication channel is free for a certain determination time DI FS and then further determines a random back-off time when the communication channel is determined to be free. Also during the back-off time, it is determined whether the communication channel is free. Then, when the communication channel is continuously free until the back-off time is over, the determination of step S4 becomes YES. When the determination of step S4 becomes YES, a move to step S5 is made.

In step S5, a WSA is transmitted from the roadside transmission part 21A. In the following step S6, a received signal strength of a signal that is received by the roadside reception part 21B, the received signal strength being stored in the memory 31M, during the transmission of the WSA in step S5 is acquired. In step S7, it is determined whether the WSA transmitted in step S5 is in collision with a signal transmitted by a different device. When there is a period during which the received signal strength acquired in step S6 is equal to or larger than a signal strength threshold set for determining collision and also when at least a part of the period overlaps the period during which the WSA is transmitted, it is determined that there is a collision of the WSA.

The roadside machine 2 executes the carrier sensing in step S3. Similarly, another roadside machine 2 executes the carrier sensing. Thus, when each of multiple roadside machines 2 can receive a WSA transmitted by another roadside machine 2, no collision occurs between WSAs transmitted by the roadside machines 2. However, in the example illustrated in FIG. 1, the roadside machine 2B is located inside the wireless communication area 6A of the roadside machine 2A, but the roadside machine 2A is located outside the wireless communication area 6B of the roadside machine 2B. Thus, when the roadside machine 2A transmits a WSA, the roadside machine 2B can determine that the communication channel is busy by the carrier sensing in step S3. However, even when the roadside machine 2B transmits a WSA, the roadside machine 2A cannot determine that the communication channel is busy by the carrier sensing in step S3.

Figure 10:
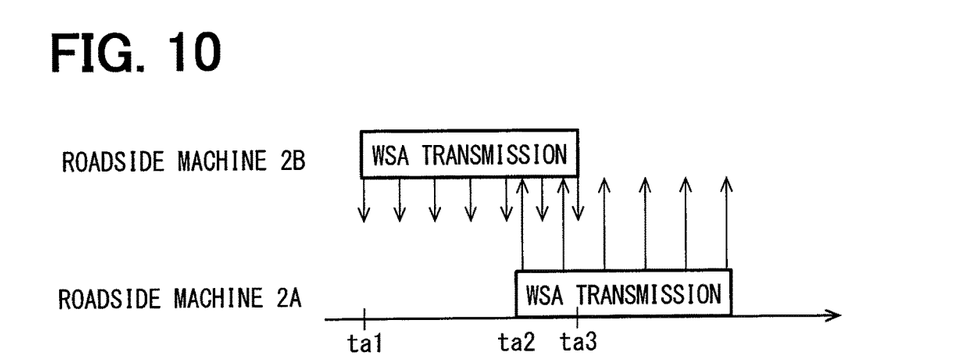
FIG. 10 is a diagram exemplifying a state in which it is determined that there is a WSA collision in step S7 of FIG. 8.

Thus, as illustrated in FIG. 10, even when the roadside control part 22 of the roadside machine 2A executes the processing of FIG. 8 between time ta1 and time ta2 which are included in a time slot in which the roadside machine 2B transmits a WSA, the determination of step S4 becomes YES. As a result, as illustrated in FIG. 10, the roadside machine 2A may transmit a WSA from time ta2. Accordingly, the roadside control part 22 of the roadside machine 2B determines that the WSAs are in collision with each other in a period from time ta2 to time ta3. In FIG. 10, each down arrow conceptually represents that the WSA transmitted by the roadside machine 2B does not reach the roadside machine 2A, and each up arrow conceptually represents that the WSA transmitted by the roadside machine 2A reaches the roadside machine 2B. When it is determined that the WSAs are in collision with each other, the determination of step S7 becomes YES, and a move to step S8 is made.

In step S8, it is determined whether a remaining time in the control channel time slot is equal to or longer than an enough time to transmit the WSA. The enough time to transmit the WSA is the total of a time during which the WSA is transmitted and a time required for carrier sensing. The carrier sensing includes the back-off time, which is randomly set. Thus, the determination in step S8 is performed assuming that the back-off time is set to a maximum value.

When the determination of step S8 is YES, a return to step S3 is made for re-transmitting the WSA. When the return to step S3 is made, carrier sensing is performed during the determination time DIFS and the back-off time. The determination time DIFS and the back-off time at this time correspond to a waiting time.

When the determination of step S8 is NO, a move to step S9 is made. Additionally, when the determination of step S7 is NO, that is, when it is determined that there is no collision of the transmitted WSA, a move to step S9 is made.

In step S9, it is determined whether the service channel time slot has come. When the determination of step S9 is NO, the determination of step S9 is repeated. When the determination of step S9 is YES, a move to the SCH processing illustrated in FIG. 9 is made.

Next, the SCH processing illustrated in FIG. 9 will be described. In FIG. 9, step S21 and step S23 are processes performed by the SCH communication control part 224, step S22 is a process performed by the service processing part 226, and step S24 and step S25 are processes performed by the CCH communication control part 223.

In step S21, the service channel is opened. In the following step S22, a service execution information transmission and reception process is performed. The service execution information includes both of information that needs to be transmitted to the onboard machine 3 by the roadside machine 2 for executing a service and information that needs to be transmitted to the roadside machine 2 by the onboard machine 3 for executing a service.

In step S23, it is determined whether the control channel time slot has come. When the determination is NO, the determination of step S23 is repeated. When the determination is YES, a move to step S24 is made.

In step S24, a CCH free time slot is determined. The CCH free time slot is a time slot in which the control channel is not busy in the immediately preceding control channel time slot. In the process of step S24, specifically, a received signal strength in the immediately preceding control channel time slot is acquired from the roadside memory 22M, and a time slot in which the acquired received signal strength is lower than the signal strength threshold is determined as the CCH free time slot.

In step S25, a WSA transmission timing in the next control channel time slot is determined. Specifically, the WSA transmission timing in the next control channel time slot is set to a timing within the earliest time slot in the CCH free time slot determined in step S24. The earliest time slot is a time slot that starts from the earliest time of the CCH free time slot, for example, a time slot of approximately SIFS used in CSA/CA or a time slot of approximately several times as long as SIFS.

Figure 11:
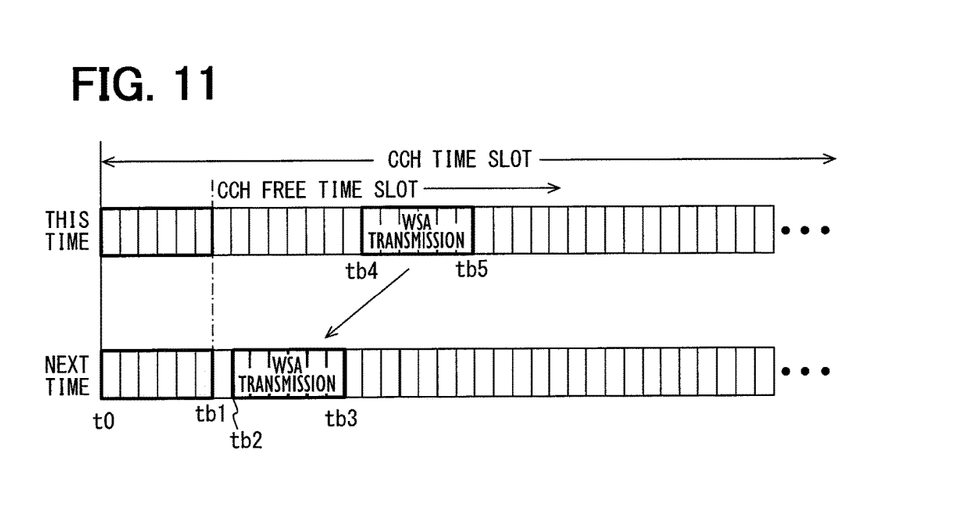
FIG. 11 is a diagram describing a WSA transmission timing determined in step S25 of FIG. 9.

FIG. 11 illustrates the next WSA transmission timing determined in step S25. In the example of FIG. 11, time tb is a time, based on the start time t0 of the control channel time slot.

In the example of FIG. 11, the current transmission timing is time tb4, and steps S3 to S5 which are processes for transmitting the WSA are executed from time tb4 to time tb5 this time. Further, the CCH free time slot determined in step S24 comes at and after time tb1. Thus, in step S25, time tb2 is set as the next WSA transmission timing. Accordingly, in the next CCH processing, time tb2 is set as the WSA transmission timing, the process for transmitting the WSA is started from time tb2, and the WSA is transmitted until time tb3. Time tb3 varies according to the back-off time, which is randomly set.

<Summary of First Embodiment>

The roadside machine 2 of the first embodiment is provided with the signal collision determination part 225. While the CCH communication control part 223 is transmitting a WSA, the signal collision determination part 225 determines whether the WSA is in collision with a signal transmitted by a different device. The frequency of the control channel is common between all roadside machines 2 that are in compliance with the WAVE standards, and all the roadside machines 2 transmit WSAs each control channel time slot. Thus, there is a high possibility that a signal that is in collision with the WSA transmitted by the roadside machine 2 that executes the processing of FIG. 8 is a WSA transmitted by another roadside machine 2. Thus, when it is determined that the WSAs are in collision with each other, the CCH communication control part 223 changes the next WSA transmission timing. Accordingly, when the WSA is transmitted next time, there is a high possibility that the transmitted WSA has no collision with the WSA transmitted by another roadside machine 2. Thus, it may be possible to reduce collision of the WSAs.

Further, in the present embodiment, the CCH communication control part 223 re-transmits the WSA when it is determined that there is a collision of the WSA and the remaining time in the control channel time slot is equal to or longer than the enough time to transmit the WSA after standby for the determination time DIFS and the back-off time. Accordingly, it may be possible that the onboard machine 3 receives the retransmitted WSA and opens the service channel that is determined by the WSA from the next service channel time slot.

However, also in the next and subsequent control channel time slots, when the WSA is transmitted with the same transmission timing as that in the retransmission, the WSA transmission timing may be shifted to a late time slot in the control channel time slot each time it is determined that there is a collision of the WSA. As a result, the WSA transmission timing may become close to the finish time of the control channel time slot.

The WSA is a signal that designates the service channel for the onboard machine 3. The onboard machine 3 performs a process for decoding the WSA after receiving the WSA and a process for opening the service channel designated by the decoded WSA. As a matter of course, these processes require a certain amount of time. Thus, when the WSA transmission timing is close to the finish time of the control channel time slot, the opening of the service channel in the onboard machine 3 may be late for the start time of the service channel time slot.

Thus, in the present embodiment, in step S24 and step S25, the WSA transmission timing in the next control channel time slot is set to the timing within the earliest time slot in the CCH free time slot. Accordingly, the WSA transmission timing is set to an early time slot in the control channel time slot. Thus, it may be possible to prevent the opening of the service channel in the onboard machine 3 from being late for the start time of the service channel time slot.

<Second Embodiment>

Next, a second embodiment will be described. In the description for the second embodiment and the subsequent modifications, an element having the same reference sign as a previously-used reference sign is identical with an element having the previously-used reference sign in the previous embodiment unless otherwise specifically noted. When only a part of the configuration is described, the previously-described embodiment can be applied to the other part of the configuration.

Figure 12:
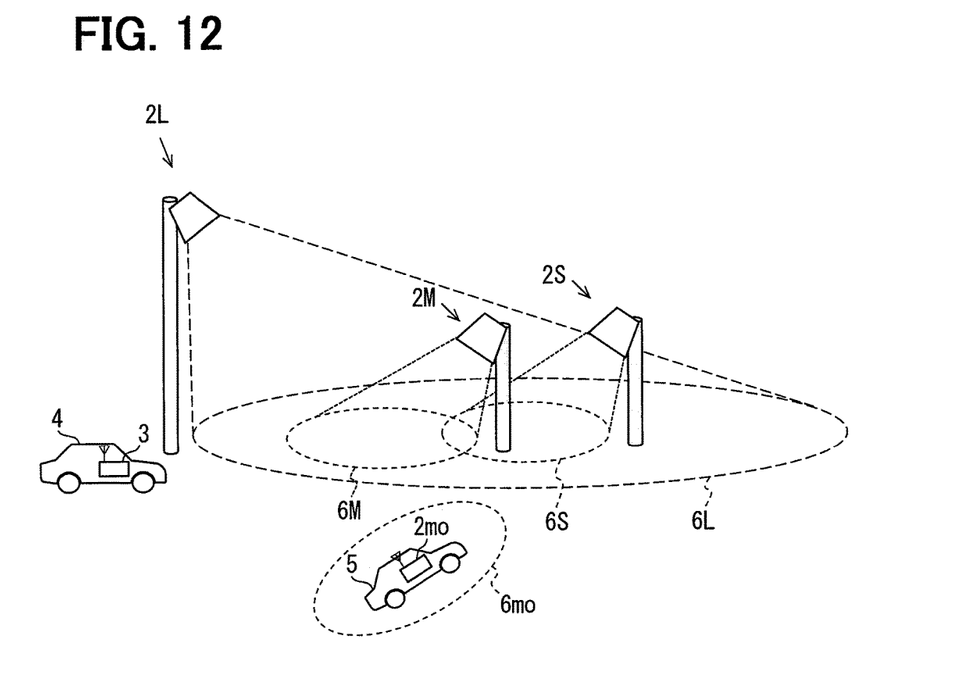
FIG. 12 is a diagram showing a configuration of a wireless communication system of a second embodiment.

As illustrated in FIG. 12, a wireless communication system 100 in the second embodiment is provided with roadside machines 2L, 2M, 2S. These roadside machines 2L, 2M, 2S are fixed roadside machines. In addition, the wireless communication system 100 in the second embodiment is also provided with a roadside machine 2mo that is a movable roadside machine and mounted on a vehicle 5.

As illustrated in FIG. 12, among wireless communication areas 6L, 6M, 6S of the roadside machines 2L, 2M, 2S, the wireless communication area 6L has the largest size, the wireless communication area 6M has the second largest size, and the wireless communication area 6S has the smallest size. Further, the wireless communication area 6L includes the wireless communication areas 6M, 6S of the roadside machines 2M, 2S. The wireless communication areas 6M, 6S partially overlap each other. The roadside machine 2M is located inside the wireless communication area 6S, but the roadside machine 2S is located outside the wireless communication area 6M. Although the size of a wireless communication area 6mo of the roadside machine 2mo is not particularly limited to any size, for example, the size of the wireless communication area 6mo may be approximately equal to the size of the wireless communication area 6S of the roadside machine 2S.

Each of the roadside machines 2L, 2M, 2S, 2mo has the same hardware configuration as the roadside machine 2 of the first embodiment. Further, processing executed by a roadside control part 22 of each of the roadside machines 2L, 2M, 2S, 2mo is the same as that in the first embodiment except step S25 of FIG. 9.

The first embodiment does not particularly refer to an initial value of the WSA transmission timing, and the initial value is not particularly limited to any value. On the other hand, in the second embodiment, in the fixed roadside machines 2L, 2M, 2S, as conceptually illustrated in FIG. 13, as the wireless communication area 6 of the roadside machine 2 is larger, the initial value of the WSA transmission timing is set to an earlier timing.

On the other hand, an initial value of a WSA transmission timing of the movable roadside machine 2mo is a fixed value that does not depend on the size of the wireless communication area 6mo in the present embodiment. The WSA transmission timing of the roadside machine 2mo is set to a point after half the control channel time slot.

Further, in the second embodiment, a minimum value of a time slot in which the WSA transmission timing is settable is determined within the control channel time slot. The minimum value refers to the earliest time. As conceptually illustrated in FIG. 14, the minimum value in the present embodiment is the same as the initial value of the WSA transmission timing in all of the fixed roadside machines 2L, 2M, 2S and the movable roadside machine 2mo.

Figure 13:
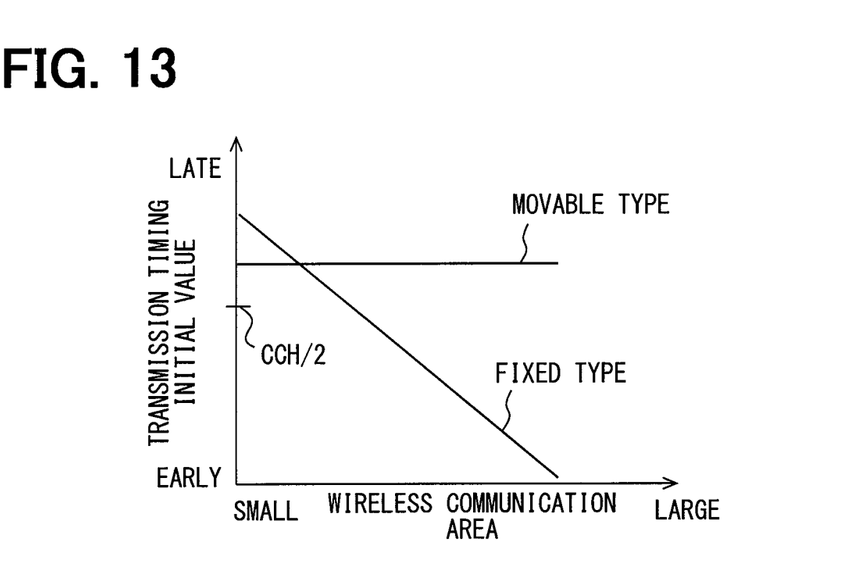
FIG. 13 is a diagram showing a graph illustrating the relationship between the size of a wireless communication area of a roadside machine and a WSA transmission timing initial value.
Figure 14:
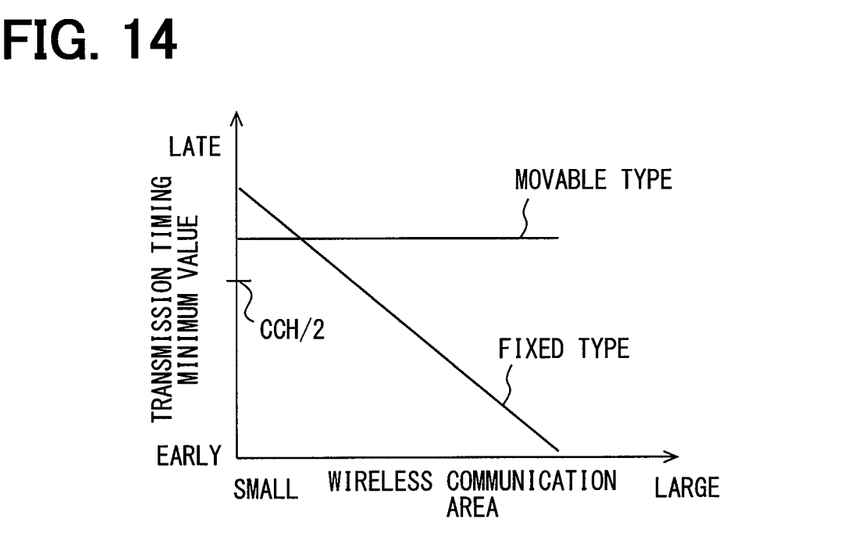
FIG. 14 is a diagram showing a graph illustrating the relationship between the size of the wireless communication area of the roadside machine and a WSA transmission timing minimum value.

The initial value and the minimum value of the WSA transmission timing are set as illustrated in FIG. 13 and FIG. 14. Thus, in step S25 in the second embodiment, the next WSA transmission timing is set to a timing within the earliest time slot after the transmission timing minimum value in the CCH free time slot.

Next, an effect obtained by setting the initial value and the minimum value illustrated in FIG. 13 and FIG. 14 will be described. The roadside machines 2L, 2M, 2S are not necessarily simultaneously installed and may be sequentially added. Here, a case in which the roadside machines 2M, 2S are first installed, and the roadside machine 2L is added thereafter will be considered.

Figure 15:
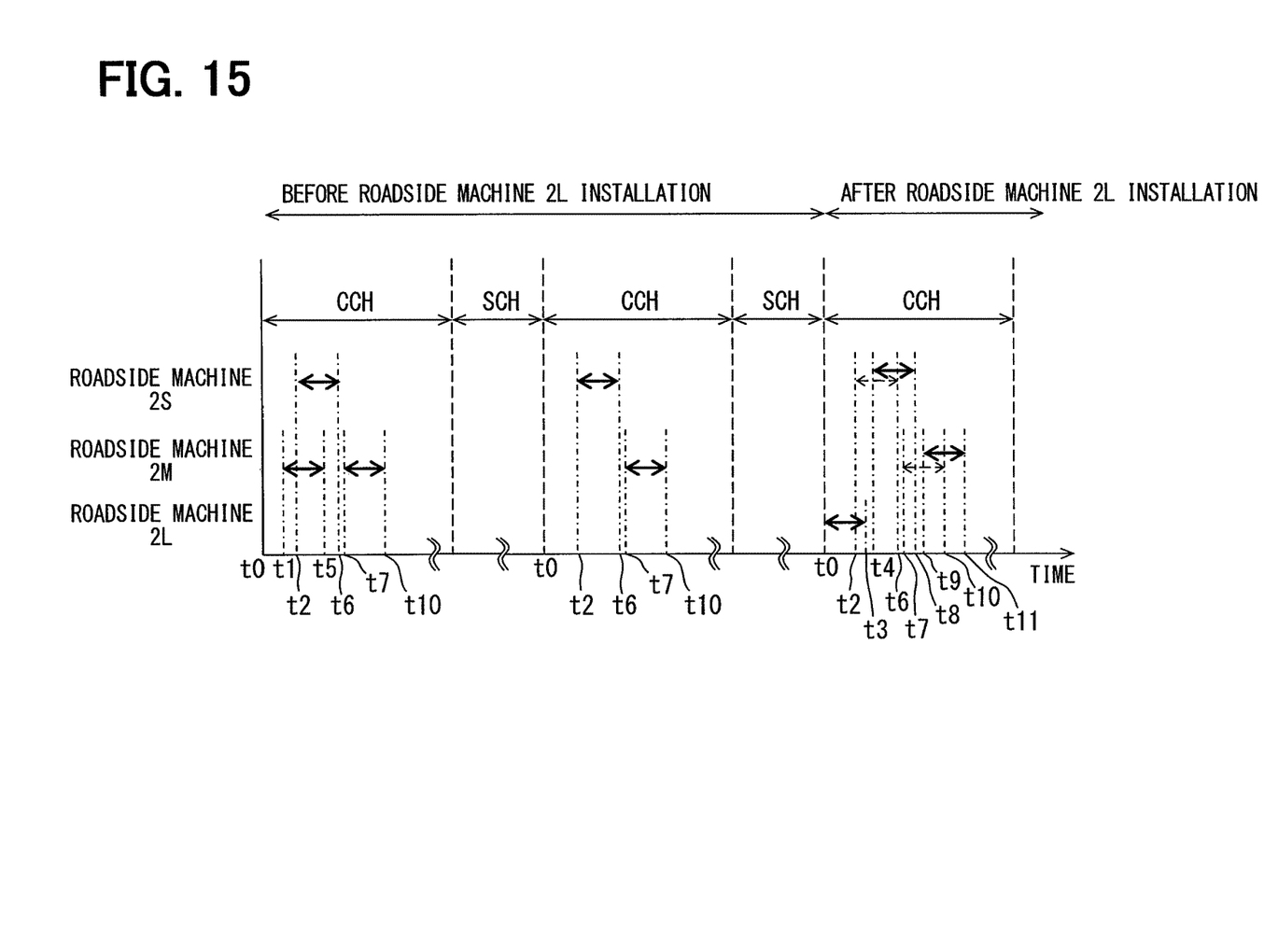
FIG. 15 is a diagram illustrating a time slot in which a WSA is transmitted in the second embodiment.

As described above, in the second embodiment, the initial value of the WSA transmission timing of each of the fixed roadside machines 2M, 2S is determined by the size of the wireless communication area 6. The initial values of the WSA transmission timings of the roadside machines 2M, 2S are defined as time t1 and time t2 as illustrated in FIG. 15. Each time t illustrated in FIG. 15 is a time, based on a start time t0 of each control channel time slot.

The roadside machine 2M starts carrier sensing from time t1. At this time, the control channel is not busy. Thus, the roadside machine 2M transmits a WSA. At time t2, the roadside machine 2S starts carrier sensing. At this time, the roadside machine 2M is transmitting the WSA. However, the roadside machine 2S is located outside the wireless communication area 6M of the roadside machine 2M and thus cannot detect the WSA transmitted by the roadside machine 2M. As a result, the roadside machine 2S also transmits a WSA. Thus, the two WSAs are in collision with each other from the start of the transmission of the WSA by the roadside machine 2S to time t5 at which the roadside machine 2M finishes the transmission of the WSA.

The roadside machine 2M is located inside the wireless communication area 6S of the roadside machine 2S. Thus, the roadside machine 2M can determine that the WSAs are in collision with each other and can also detect that the roadside machine 2S finishes the transmission of the WSA at time t6. In the example of FIG. 15, at the time when the roadside machine 2S finishes the transmission of the WSA, the time for transmitting the WSA is still left within the control channel time slot. Thus, the roadside machine 2M re-transmits the WSA at time t7 as a new WSA transmission timing. The retransmission of the WSA ends at time t10.

In the next control channel time slot, the WSA transmission timing of the roadside machine 2M is time t7. Thus, the WSA transmitted by the roadside machine 2S has no collision with the WSA transmitted by the roadside machine 2M.

When the roadside machine 2L is installed, as illustrated in a time slot after the installation of the roadside machine 2L in FIG. 15, the roadside machine 2L starts carrier sensing from time t0 and transmits a WSA. The roadside machine 2L finishes the transmission of the WSA at time t3. Thus, when the roadside machine 2S starts carrier sensing from time t2 in the same manner as the carrier sensing before the installation of the roadside machine 2L, the roadside machine 2S can detect the WSA transmitted by the roadside machine 2L and determine that the control channel is busy.

As the wireless communication area 6 of a roadside machine 2 is larger, a WSA transmitted by the roadside machine 2 is more easily detected by another roadside machine 2. In other words, as the wireless communication area 6 of a roadside machine 2 is smaller, a WSA transmitted by the roadside machine 2 is less easily detected by another roadside machine 2. As a result, the possibility of a WSA collision becomes higher.

Thus, in the second embodiment, in order to make the WSA transmission timing earlier as the wireless communication area 6 is larger, the initial value and the minimum value are set to earlier times as the wireless communication area 6 is larger.

Although the roadside machine 2S starts carrier sensing from time t2, the roadside machine 2S cannot determine that the control channel is free until time t3. Thus, the WSA transmission timing of the roadside machine 2S is time t4, and the roadside machine 2S transmits the WSA until time t8.

Although the roadside machine 2M also starts carrier sensing from time t7 in the same manner as the carrier sensing before the installation of the roadside machine 2L, the roadside machine 2M cannot determine that the control channel is free until time t8. Thus, the WSA transmission timing of the roadside machine 2M is time t9, and the roadside machine 2M transmits the WSA until time t11.

In the example of FIG. 15, the roadside machine 2M first changes the WSA transmission timing. Thereafter, when the roadside machine 2L is added, the roadside machine 2S and the roadside machine 2M change the respective WSA transmission timings. Accordingly, the WSAs transmitted by the respective three roadside machines 2L, 2M, 2S have no collision with each other.

Figure 16:
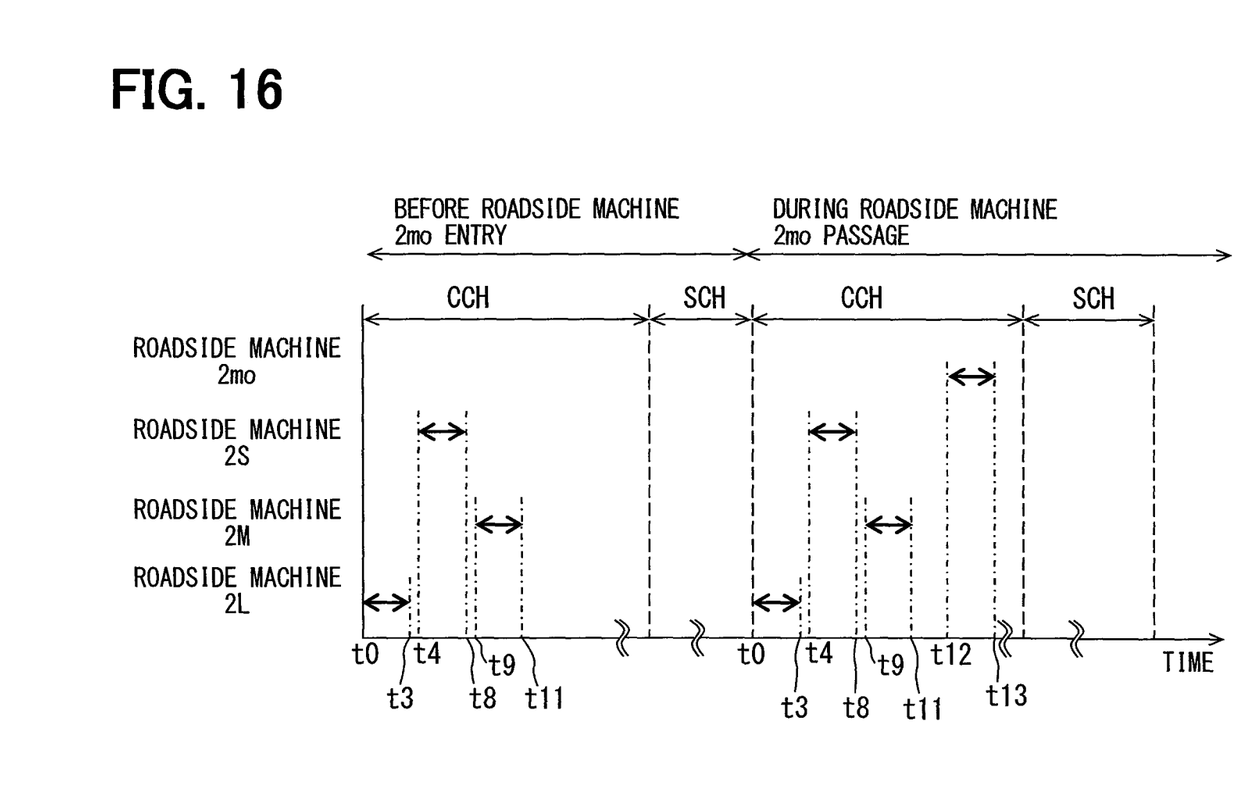
FIG. 16 is a diagram exemplifying a time slot in which the WSA is transmitted in the second embodiment.

Next, a case in which the roadside machine 2*mo* passes through the wireless communication area 6L of the roadside machine 2L will be considered. Before the roadside machine 2*mo* enters the wireless communication area 6L of the roadside machine 2L, as illustrated in FIG. 16, the roadside machines 2L, 2M, 2S transmit WSAs in a time slot of time t0 to time t3, a time slot of time t9 to time t11, and a time slot of time t4 to time t8, respectively. Thus, the WSAs transmitted by the respective roadside machines 2L, 2M, 2S have no collision with each other.

The WSA transmission timing of each of the fixed roadside machines 2L, 2M, 2S is set within the earliest time slot after the transmission timing minimum value in the CCH free time slot. Thus, the WSA transmission timing of each of the fixed roadside machines 2L, 2M, 2S is likely to become an early time slot in the control channel time slot. On the other hand, the initial value and the minimum value of the WSA transmission timing of the movable roadside machine 2*mo* are set to a point after half the control channel time slot. Thus, in a time slot during the passage of the roadside machine 2*mo* in FIG. 16, the movable roadside machine 2*mo* transmits the WSA in a time slot from time t12 to time t13. Time t12 is after time t11 when the roadside machine 2M finishes the transmission of the WSA. Thus, even when the roadside machine 2*mo* passes through the wireless communication areas 6L, 6M, 6S, it is unnecessary for the roadside machines 2L, 2M, 2S to change their WSA transmission timings.

Although the embodiments have been described above as examples, the present disclosure is not limited to the above embodiments. Various embodiments including the following modifications can be employed.

<First Modification>

For example, in the above embodiments, when it is determined that there is no WSA collision, the CCH free time slot is determined in step S24, and the next WSA transmission timing is determined, based on the determined CCH free time slot in step S25. However, when it is determined that there is no WSA collision, the WSA transmission timing may be maintained.

<Second Modification>

In the above embodiments, the roadside machine 2 is provided with the circulator 21*c* so that the roadside reception part 21B can acquire an electric wave received by the antenna 21*d* while the roadside transmission part 21A is transmitting a signal. However, the present disclosure is not limited thereto. A transmission antenna and a reception antenna may be separately provided so that the roadside reception part 21B can receive an electric wave while the roadside transmission part 21A is transmitting a signal.

<Third Modification>

In the second embodiment, the WSA transmission timing of the movable roadside machine 2*mo* is set to the point after half the control channel time slot. However, the WSA transmission timing of the movable roadside machine 2*mo* may be a point after two thirds of the control channel time slot or may be a point after three quarters of the control channel time slot.

The invention claimed is:

1. A wireless communication apparatus comprising:
a transmission part that transmits an electric wave;
a transmission control part that transmits, within a transmission time slot that is periodically repeated, a repetitive signal of an electric wave that needs to be repeatedly transmitted from the transmission part at a transmission timing determined, based on a start time of the transmission time slot, and repeatedly transmits the repetitive signal by repetition of the transmission time slot;
a reception part that receives an electric wave; and
a signal collision determination part that determines whether the repetitive signal transmitted from the transmission part is in collision with a signal transmitted by a different device, based on the electric wave received by the reception part while the transmission control part is transmitting the repetitive signal,
wherein:
the transmission control part changes the transmission timing of the repetitive signal, based on a determination by the signal collision determination part that a collision of the repetitive signal occurs;
when the signal collision determination part determines that a collision of the repetitive signal occurs,
the transmission control part re-transmits the repetitive signal, based on a determination that a remaining time in the transmission time slot after a waiting time is over is equal to or longer than an enough time to transmit the repetitive signal within the transmission time slot;
the transmission part is capable of selecting and setting a transmission channel that is a frequency channel transmitting an electric wave from a control channel and a plurality of service channels, the control channel and the service channels being frequency channels different from each other;
the transmission control part sets, in a control channel time slot and a service channel time slot that are alternately repeated, the transmission channel to the control channel in the control channel time slot, and transmits, as the repetitive signal, service start information including information that determines the service channels to be opened in the service channel time slot from the transmission part to a service receiving terminal that receives a service;
the transmission control part sets the transmission channel to the service channels in the service channel time slot, and transmits service execution information for executing the service; and
when the signal collision determination part makes no determination that a collision of the service start information occurs, the transmission control part sets a next transmission timing of the service start information to an earliest time slot in a time slot in which the reception part receives no electric wave having a strength equal to or higher than a strength with which the control channel is determined to be busy within a time slot in which the transmission timing is settable in the control channel time slot.

2. The wireless communication apparatus according to claim 1, wherein:
the transmission control part sets an initial value of the transmission timing to an earlier timing as a transmission range in which the transmission part transmits the service start information is larger.

3. The wireless communication apparatus according to claim 1, wherein:
a start point of a time slot in which the transmission timing is settable is an earlier point as a transmission range in which the transmission part transmits the service start information is larger.

4. The wireless communication apparatus according to claim 1, wherein:
the transmission control part maintains the transmission timing of the repetitive signal, based on a determination by the signal collision determination part that no collision of the repetitive signal occurs.

5. A wireless communication system comprising:
the wireless communication apparatus according to claim 1 that is a movable wireless communication apparatus; and
the wireless communication apparatus according to claim 1 that is a fixed wireless communication apparatus, wherein:
a time slot in which the transmission timing is settable is at and after a point when half of the control channel time slot elapses in the movable wireless communication apparatus.

* * * * *